June 10, 1941.  C. W. OBERT  2,245,222

METHOD OF WELDING

Original Filed Feb. 17, 1938

INVENTOR
CASIN W. OBERT
BY
E. Greenewald
ATTORNEY

Patented June 10, 1941

2,245,222

UNITED STATES PATENT OFFICE 2,245,222

METHOD OF WELDING

Casin W. Obert, Mount Vernon, N. Y., assignor, by mesne assignments, to Union Carbide and Carbon Corporation, a corporation of New York Original application February 17, 1938, Serial No. 711,660, now Patent No. 2,123,612, dated July 12, 1938. Divided and this application June 14, 1938, Serial No. 213,567

2 Claims. (Cl. 113—112)

This invention relates to the local application of heat to desired portions of metal bodies, in practices such as gas fusion welding. This application is a division of my copending application Serial No. 711,660, filed February 17, 1934, and entitled "Heat economizer," now U. S. Patent No. 2,123,612.

In practices such as gas fusion welding, an approach to the complete conservation and efficient application of heat to a desired region has been accomplished, if at all, with great difficulty. Much of the heat has been wasted due to control of the gaseous currents set up by the application of heat being insufficient to prevent turbulence at the point of application, sufficient control being necessary to insure steadiness and constancy of heating. Furthermore, in practices such as gas fusion welding, substantially all of the heat of the flames not radiated downwardly upon the metal is wasted. Much of this heat may be conserved by confining it within a restricted area surrounding the region of heat application, but the greatest benefit can not be obtained without a concentration of this heat upon the specific region being heated. This has not heretofore been accomplished, and a considerable amount of the heat supplied has been carried away by the gaseous currents set up at or around the point of heat application. In addition, the gaseous currents themselves have not been effectively utilized in heating desired regions removed from the point of local heat application, for purposes such as preheating a seam to be welded or postheating a weld to prevent too rapid cooling thereof.

Among the objects of this invention are to provide an improved method of applying heat to desired portions of metal bodies in practices such as fusion welding, so that the heat supplied is more completely conserved and effectively utilized; to provide such a method in which heat is more completely and effectively concentrated upon the region of heat application; to provide such a method in which turbulence of currents of heated gases produced by application of heat is prevented; and to provide such a method in which hot gaseous currents may be so routed from the point of heat application as to be most effectively employed in applying heat to other desired regions.

In accordance with this invention, heat is applied to a metal body or bodies in the region of desired high heat application by a blowpipe or other suitable high temperature heating means; the heat is confined about this region to a restricted area adjacent and preferably surrounding the region of heat application; and the heat in the restricted area which is not applied directly to the desired region is reflected or reradiated so as to be focused and concentrated upon the region of heat application. Turbulence in hot gaseous currents set up by the application of heat is prevented by dividing these currents into a plurality of streams and routing these streams to and over a desired region, preferably through stream-line channels. These gaseous currents are preferably divided into two streams which are directed around and to either side of the region of heat application, and the two streams are merged into a single stream before passage over the desired region. In addition, a small portion of the heated gases may be led over a separate desired region, but without directing the same around the region of heat application.

In fusion welding, a desired region may be a portion of the seam to be welded, since when unwelded portions of the seam are preheated, the lesser amount of heat necessary in the welding zone permits a faster rate of welding. A separate desired region may be the completed weld itself, since by postheating the weld, too rapid cooling thereof is prevented and a weld is produced which has an increased ductility and a more refined grain structure.

Apparatus particularly useful in carrying out the method of this invention is disclosed and claimed in said application Serial No. 711,660, but it will be understood that the method of this invention is not limited to the use of such apparatus.

Other objects and novel features of this invention will become apparent from the following description of a specific embodiment thereof in which is utilized a heat economizer illustrated in the accompanying drawing, in which.

Figure 1:
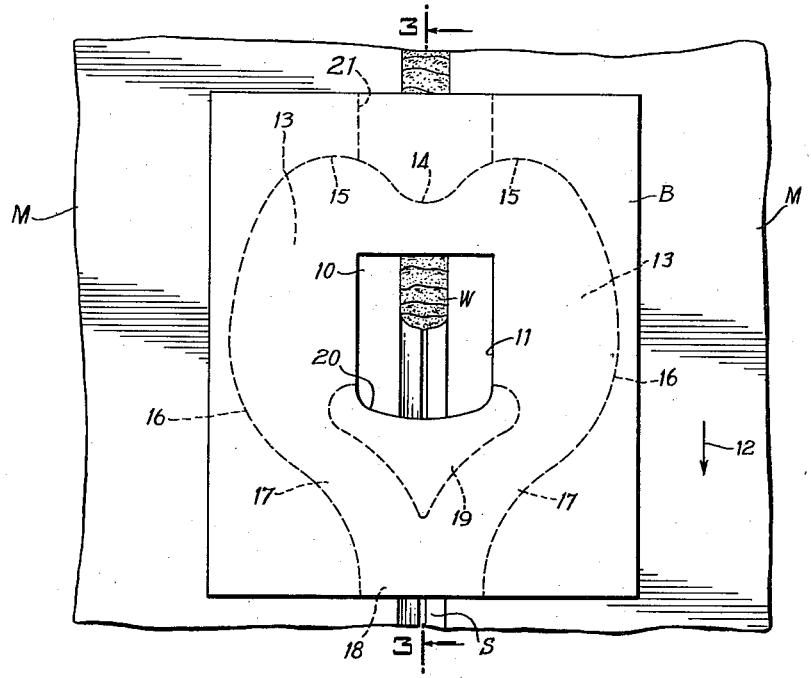
Fig. 1 is a plan view of a heat economizer overlying a welding seam.

The heat economizer illustrated in the drawing, which is disclosed and claimed in said application Serial No. 711,660, comprises a block B of any suitable refractory material, the block overlying a seam S between two metal bodies M which are to be welded together. The refractory material of which the block is composed is preferably material which will attain the optimum condition of incandescence when highly heated so as to provide a maximum efficiency in reflecting or reradiating heat back into the region of high heat application. A magnesite mixture with a suitable binder, such as a small percentage of "Albany" slip clay, has been found to be suitable for this purpose, but cerium oxide or other suitable material may be used in place of the magnesite.

Figure 2:
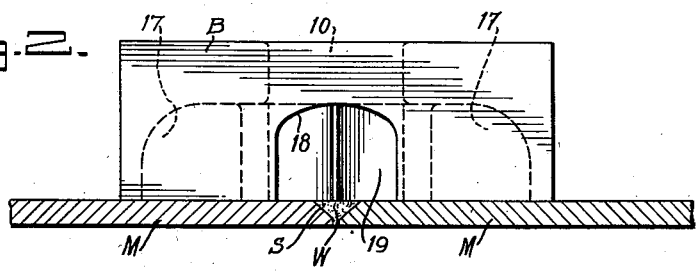
Fig. 2 is a front end view thereof.
Figure 3:
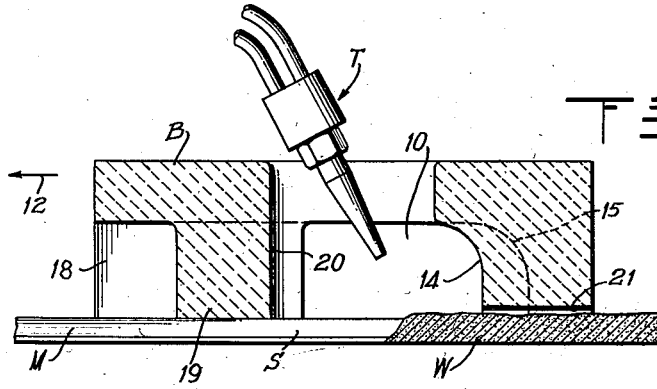
Fig. 3 is a longitudinal sectional view taken along the line 3—3 of Fig. 1.

The block B is provided with a chamber 10 which is substantially enclosed on all sides and at the top except for an aperture or opening 11 which permits admission into the chamber 10 of suitable heating apparatus, such as a welding blowpipe or torch T. This opening should be of sufficient size to permit a clear, unobstructed view of the region of heat application, and to provide a sufficient space for manipulation of the heating means in controlling the condition of the base metal in the welding region, but should not be large enough to permit escape of any appreciable amount of heat. In depositing weld metal W in the seam S, welding proceeds in the direction of arrow 12, and block B is moved along seam S in the direction of this arrow as welding progresses. The heating flame from torch T is directed at an angle to the bodies M, as will be apparent from Fig. 2, and heated gases thus flow in a current along the bodies and seam S.

The chamber 10 is open at the bottom and is provided with a wide expanse or enlarged portion 13 on either side of the point of welding or region of heat application. The rear wall of the chamber (considering the direction in which local heating progresses as indicated by arrow 12) is provided with a ridge 14 extending vertically and in opposition to the point of heat application so as to divide heated gases, immediately upon being formed or set in motion or after flowing along the seam S a relatively short distance, into two streams which are directed in opposite directions by curved rear walls 15 of the chamber. The two streams are then turned and directed forwardly around and to either side of the region of heat application and along side walls 16 of the chamber into channels 17. The two streams thus are directed in counter-current relation to the main stream of heated gases, principally issuing from torch T. Channels 17 unite in an outlet channel 18 at the front end of the block B, the heated gases being discharged through outlet channel 18 over the unwelded portion of the seam S in order to preheat the same, the channel 18 preferably being positioned so as to overlie the seam when the heat economizer is in operating position on the work. Channels 17 and 18 also are open at the bottom so that the full effect of the heat of hot gases passing therethrough will be applied to the sides of seam S.

The inner walls of channels 17 comprise surfaces of a projection 19 which constitutes a part of the block B, and the sides of channels 17 are preferably substantially parallel. The surfaces of channels 17 and 18, as well as the inner surfaces of chamber 10, are preferably stream-lined so as to present a minimum obstruction to the flow of gases therethrough. Front wall 20 of the chamber 10, which is disposed opposite the ridge 14 and on the opposite side of the region of heat application, is preferably concave on a curved line, the focal point of which lies in the region of intense heat application. The rear, side, and top walls of the chamber 10, so far as is practical, also are preferably concave or otherwise suitably shaped so that their foci will be within the region of intense heat application, in order to reflect or reradiate any heat radiated thereupon into the region of intense heat application.

In order to direct a portion of the heated gases to and over a separate desired region, such as the completed weld (in order to prevent too rapid cooling thereof), the rear of block B may be cut away at the bottom to form a rear channel 21, which also bridges the finished weld.

From the foregoing description, it can be seen that not only is the heat directly applied to the region of intense heat application utilized, but also the heat radiated from the blowpipe flame on all sides thereof, the latter heat being reflected or reradiated back into the welding region by the curved walls of chamber 10. In addition, by dividing the gases into a plurality of streams, and directing these streams around the welding region, the usual turbulence is prevented, and a stable unwavering flame is insured.

Although the embodiment of this invention described has particular reference to gas fusion welding, it will be understood that the heated gases may be routed over any desired region by changing the position of the hood on the stream, and that the heating means need not be a blowpipe or torch, but may be an electric arc or other localized heating means. In addition, the method of applying heat in accordance with the principles of this invention may be utilized not only in gas fusion welding, but in other practices, such as localized surface hardening, or flame cutting, since the principles of this invention are applicable to any instance in which a portion or successive portions of a metal body or bodies are heated locally, and are more particularly applicable to instances in which it is desirable to apply heat to other regions than that of direct heat application. It will also be understood that other changes may be made without departing from the spirit and scope of this invention.

What is claimed is:

1. A method of fusion welding metal members together, comprising applying a high temperature heating flame to successive regions thereof and at an angle thereto; confining radiant heat to a restricted area adjacent the region of heat application; reradiating radiant heat in said area into the region of heat application; dividing heated gases in the region of heat application into two streams; reversing the direction of flow and directing said two streams around and alongside said region of heat application on opposite sides thereof; after said two streams have passed said region, merging said two streams into a single stream; and directing said single stream over a portion of the seam to be welded so as to preheat the same.

2. A method of fusion welding as defined in claim 1, in which a small portion of the heated gases is directed over the completed weld so as to prevent too rapid cooling thereof.

CASIN W. OBERT.